US011292852B2

(12) United States Patent
Chen et al.

(10) Patent No.: US 11,292,852 B2
(45) Date of Patent: Apr. 5, 2022

(54) METHOD FOR EXTRACTING RG-I-RICH PECTIN

(71) Applicant: ZHEJIANG UNIVERSITY, Hangzhou (CN)

(72) Inventors: Shiguo Chen, Hangzhou (CN); Hua Zhang, Hangzhou (CN); Xingqian Ye, Hangzhou (CN); Donghong Liu, Hangzhou (CN); Jiaqi Zheng, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 47 days.

(21) Appl. No.: 16/648,227

(22) PCT Filed: Sep. 26, 2017

(86) PCT No.: PCT/CN2017/103412
§ 371 (c)(1),
(2) Date: Mar. 18, 2020

(87) PCT Pub. No.: WO2019/061018
PCT Pub. Date: Apr. 4, 2019

(65) Prior Publication Data

US 2020/0283547 A1 Sep. 10, 2020

(51) Int. Cl.
*C08B 37/00* (2006.01)

(52) U.S. Cl.
CPC ................................ *C08B 37/0048* (2013.01)

(58) Field of Classification Search
CPC .............................. A23C 9/13; C08B 37/0048
USPC .............................................................. 536/2
See application file for complete search history.

(56) References Cited

FOREIGN PATENT DOCUMENTS

| | | | | |
|---|---|---|---|---|
| CN | 102702379 | A | | 10/2002 |
| CN | 102443074 | A | | 5/2012 |
| CN | 103191289 | A | * | 7/2013 |
| CN | 103923225 | A | | 7/2014 |
| CN | 104987433 | A | | 10/2015 |
| CN | 105542033 | A | | 5/2016 |
| CN | 106893001 | A | | 6/2017 |
| CN | 107629135 | E | | 1/2018 |
| WO | 2012148277 | A | | 11/2012 |
| WO | 2016192450 | A | | 12/2016 |

OTHER PUBLICATIONS

Maxwell et al. (Carbohydrate Polymers 136 (2016) 923-929).*
Siti Nurdjanah (Thesis, Feb. 2008; pages i-xii, 1-182).*
Fares et al. (Zuckerindustrie (Berlin, Germany) (2003), 128(4), 243-249).(abstract sent).*
Gao et al.; CN 103191289 A; Jul. 10, 2013 (Machine-English Translation).*
International Search Report (PCT/CN2017/103412); dated Jun. 28, 2018.

* cited by examiner

*Primary Examiner* — Shaojia A Jiang
*Assistant Examiner* — Michael C Henry
(74) *Attorney, Agent, or Firm* — W&G Law Group

(57) ABSTRACT

The present disclosure discloses a method for extracting a RG-I-rich pectic polysaccharide. The method comprises the following steps: mixing and stirring a citrus fruit peel powder and a dilute hydrochloric acid solution at a low temperature to destroy cell walls of citrus peels, filtering, and then mixing the retentate with a sodium hydroxide solution for low temperature extraction, adding ethanol to the solution obtained by filtering to precipitate, and washing the obtained polysaccharide with ethanol and drying to obtain the above pectic polysaccharide. Compared with the traditional extraction method, this method reduces the hydrolysis of pectin side chains by controlling the extraction temperature, and the extracted pectic polysaccharide is rich in RG-I domain and has higher biological activity such as cancer and cardiovascular disease prevention. Energy can be greatly saved because of the low extraction temperature. The extracted pectic polysaccharide can be potentially used as functional food ingredients.

5 Claims, 4 Drawing Sheets

METHOD FOR EXTRACTING RG-I-RICH PECTIN

CROSS-REFERENCE TO RELATED APPLICATIONS

This is the United States national phase of International Patent Application No. PCT/CN2017/103412, filed on Sep. 26, 2017, the entire contents of which are incorporated herein by reference.

TECHNICAL FIELD

The present disclosure relates to a method for extracting an RG-I-rich pectin.

BACKGROUND

Pectin is a complex macromolecular polysaccharide widely found in fruits, roots, stems and leaves of plants, and is an important component of plant cell interstitium. Its structure is complex, and it is generally accepted that pectin has three types of structural domains, including homogalacturonan (HG), rhamnogalacturonan I (RG-I) and rhamnogalacturonan II (RG-II). Pectin as a gelling agent, a stabilizer and a thickener is widely used in the food industry, such as jam, jelly, candy, juice and other products, and can also be used for fat alternatives, film formation, drug delivery and tissue engineering. Although the annual turnover of pectin in the global market has exceeded $850 million in 2013, pectin is still in short supply. In order to obtain pectin with uniform quality and good gelling properties, producers usually treat raw materials under strong acid and high temperature conditions. which will degrade the side chains of pectin. The obtained commercial pectin is usually composed mainly of an HG structure, and has few RG-I structures, and the content of galacturonic acid is higher than 65%.

With the deepening of the research, researchers found that the RG-I structure in pectin can bind to galectin-3 to better prevent cancer, cardiovascular diseases and the like. Galectin-3 (Gal-3) contains a specific recognition domain that can bind to other proteins and peptides to induce cell adhesion, migration, transformation, and cell apoptosis. The RG-I side chain of pectin can occupy this recognition domain, thereby inhibiting the activity of Gal-3. Studies have shown that arabinose and galactose on the RG-I structure in pectic polysaccharide can significantly inhibit agglutination of red blood cells.

In order to improve the extraction efficiency of pectin and reduce the use of chemicals, the researchers have tried to extract pectin with new technologies. Jongbin Lim et.al compared the properties of pectin extracted from citrus junos pomace by the traditional chemical extraction method and by a combined physical enzymatic method. The results showed that the neutral sugar content of pectin obtained by the combined physical enzymatic method (17.6%) was higher than that obtained by the traditional chemical method (11.1%).

SUMMARY

An object of the present disclosure is to provide a method for extracting RG-I-rich pectin in order to overcome the deficiencies of the prior art. The method comprises acid treatment and subsequent alkali treatment, at room temperature, thereby greatly preventing the hydrolysis of the side chain of pectin in a citrus fruit powder, and obtains RG-I structural domain-rich pectin with lower esterification degree after alcohol precipitation, washing and drying.

The object of the present disclosure is achieved by the following technical solution: a method for extracting RG-I-rich pectin, comprising the following steps:

(1) drying and crushing citrus fruit peels, mixing the dried and crushed citrus fruit peels with 0.1 to 1.0 wt % of a dilute hydrochloric acid solution according to a solid-liquid ratio of 1:30 g/ml, performing magnetically stirring at a constant temperature of 10 to 40° C. for 10 to 120 min, and then performing filtering with a 400-mesh filter bag to obtain a filtrate and a retentate;

(2) dispersing the retentate obtained in step (1) in 0.1 to 2.0 wt % of a sodium hydroxide solution having an equal volume to that of the dilute hydrochloric acid used in step (1), performing magnetically stirring at a temperature of 10 to 40° C. for 5 to 120 min, and performing filtering with a 400-mesh filter bag;

(3) adjusting pH of a filtrate obtained in step (2) to 6 to 7 with 2 M hydrochloric acid, then performing precipitation with 95% by volume of ethanol having an equal volume to that of the filtrate obtained in step (2) for 2 to 3 h, and, performing filtering with a 400-mesh filter bag after the precipitation is completed to obtain a retentate alkali-extracted pectic polysaccharide; and (4) washing the retentate alkali-extracted pectic polysaccharide 1 to 4 times with 95 wt % of ethanol to obtain a refined alkali-extracted pectic polysaccharide.

Furthermore, a mass fraction of HCL in the dilute hydrochloric acid solution is 0.3% to 0.7%, and a mass fraction of NaOH in the sodium hydroxide solution is 0.3 to 0.7%.

Furthermore, mixing and stirring of the dilute hydrochloric acid solution and the dried and crushed citrus fruit peels are controlled at a temperature of 20° C. to 40° C., and extraction with the sodium hydroxide solution in step (2) is controlled at a temperature of 20° C. to 40° C.

Furthermore, stirring of the dilute hydrochloric acid solution and the dried and crushed citrus fruit peels is controlled within 30-60 min, and extraction with the sodium hydroxide solution in step (2) is controlled within 10-50 min.

Furthermore, after the alkali-extracted pectic polysaccharide is obtained from alcohol precipitation, the polysaccharide is washed 2 to 3 times with 95% ethanol, so as to obtain a polysaccharide having good properties after drying.

The citrus fruit pectin extraction method provided by the present disclosure has the beneficial effects that the present disclosure retains the side chain of pectin under mild extraction conditions, thereby obtaining the pectic polysaccharide having a high proportion of the RG-I structural domain. Firstly, the cell wall is destroyed through treatment with hydrochloric acid at a low temperature, so that the binding of most of the pectin to cellulose in the cell wall is loosened, and then the highly branched pectin can dissolve out by low-temperature treatment with sodium hydroxide, and finally the pectic polysaccharide rich in RG-I structure is obtained by pH control and then alcohol precipitation.

DESCRIPTION OF EMBODIMENTS

Example 1

Figure 1:
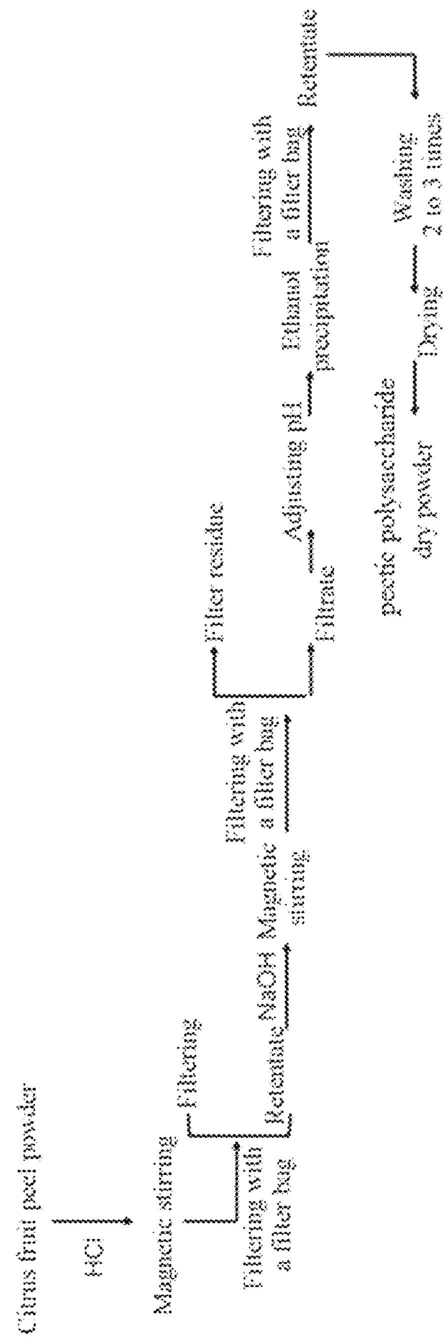
FIG. 1 is a flow chart of extracting pectic polysaccharide.

After being dried and crushed, 50 g of citrus fruit peels were mixed with 1500 ml of a 0.3 wt % dilute hydrochloric acid solution, magnetically stirred at a constant temperature of 20° C. for 30 min, and then filtered with a 400-mesh filter bag to obtain a filtrate and a retentate. The retentate was mixed with 1500 ml of a 0.3 wt % sodium hydroxide solution, magnetically stirred at a temperature of 20° C. for 10 min, and filtered with a 400-mesh filter bag, and the pH of the filtrate was adjusted to 6 with 2 M hydrochloric acid, and precipitated with 1500 ml of 95% ethanol for 2 h. After the precipitation was finished, a retentate obtained by filtering with a 400-mesh filter bag was washed twice with 200 ml of 95% ethanol. The washed retentate was dried at a temperature of 55° C. for 24 h, and weighed to obtain 9.47 g dry pectic polysaccharide, and the yield was 18.93%.

Determination of Properties and Structure of the Obtained Pectic Polysaccharide:

Monosaccharide Composition

Monosaccharide composition analysis was based on phenylpyrazolone-high performance liquid chromatography by Strydom (Strydom, 1994). A pectic polysaccharide sample (2 to 3 mg) was hydrolyzed in 2M trifluoroacetic acid at a temperature of 110° C. for 8 h, then neutralized with 0.1 M sodium hydroxide and dried by nitrogen blowing. The dried sample was dissolved in 450 μl of 0.3 M sodium hydroxide, and added with 450 ul of a 0.5 M PMP methanol solution to be derivatized for 30 min at a temperature of 70° C. Finally, the mixture was neutralized with 0.3 M hydrochloric acid and extracted three times with 1 ml of chloroform. 1 ml of supernatant passed through a 0.22 μm membrane to be tested. High performance liquid chromatography analysis conditions: Waters e2695 (Waters, US) instrument equipped with a Zorbax Eclipse XDB-C18 column (250 mm×4.6 mm, 5 μm, Agilent, USA), test temperature: 25° C., detector: 2489 UV/Vis Detector (Waters, US), detection wavelength: 250 nm; flow rate: 1 mL/min; mobile phase: solvent A: 15% (v/v) acetonitrile+0.05 mol/L phosphate buffer solution (pH=6.9), and solvent B: 40% acetonitrile+0.05 mol/L phosphate buffer solution (pH=6.9); gradient mode: time gradient: 0 min→10 min→30 min→35 min→45 min, and corresponding concentration gradient: 0→15%→25%→25%→0 solvent B; and injection volume: 10 ul.

TABLE 1

Monosaccharide composition of pectic polysaccharide

| Monosaccharide types | Galacturonic acid | Rhamnose | Glucose | Galactose | Arabinose |
|---|---|---|---|---|---|
| Content (wt %) | 23.37 | 11.36 | 9.47 | 19.72 | 36.08 |

As can be seen from Table 1, the pectic polysaccharide contains only 23.37% of acidic polysaccharide, and the proportion of neutral sugar is higher. The neutral sugar mainly comprises rhamnose, galactose, arabinose and glucose. The value of rhamnose/galacturonic acid is 0.49, indicating that the pectic polysaccharide consists mainly of the RG-I structure. The value of (galactose+arabinose)/rhamnose is up to 4.91, further indicating that the hairy region and side chain occupy a higher proportion in the polysaccharide.

Molecular Weight

The pectic polysaccharide was dissolved in purified water to prepare a solution having a concentration of 5 mg/ml, and passed through a 0.45 um water film, and then 50 ul of the solution was injected into an SEC-MALLS-RI ((Wyatt Dawn Heleos-II, USA) system to be tested. The column used was Shodex SB-806 HQ (Showa Denko KK, Japan), the mobile phase was a 0.15 M sodium chloride solution, the flow rate was 0.5 ml/min, and do/dc=0.1850 mL/g. It was determined that the pectic polysaccharide had a weight average molecular weight of 743.2 kDa, a number average molecular weight of 191.7 kDa, and dispersibility of 3.876.

FT-IR

Figure 2:
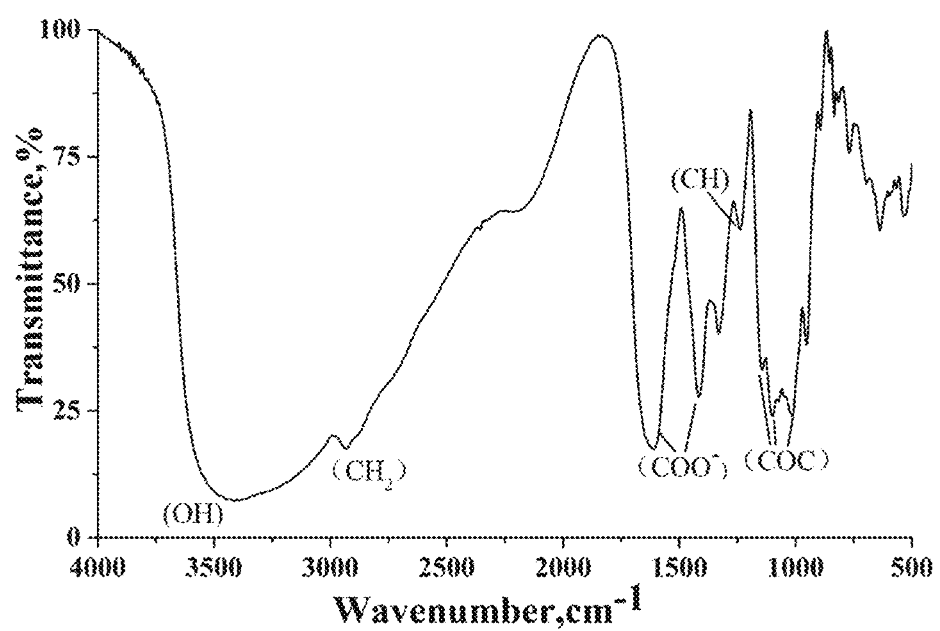
FIG. 2 is an FT-IR spectrum of pectic polysaccharide.

The infrared spectrum of the pectic polysaccharide was determined by using Nicolet iN10 (Thermo Fisher Scientific, USA). Approximately 1 mg of the sample and 200 mg of a potassium bromide powder were mixed, ground, and then pressed into small pieces for infrared spectral scanning at a frequency ranging from 4000 to 400 $cm^{-1}$. The obtained spectrogram is shown in FIG. 2. The absorption peak of the pectic polysaccharide at 3421 $cm^{-1}$ was caused by the stretching vibration of the hydroxyl group. The peak at 2933 $cm^{-1}$ was caused by the stretching vibration of —CH2. In addition, the region between 1800 $cm^{-1}$ and 1500 $cm^{-1}$ was an important region for calculating the degree of esterification of the pectic polysaccharide. From the spectrogram, it can be seen that there is only the peak generated by the free carboxyl group at 1610 $cm^{-1}$ and no methyl-esterified carboxyl peak, indicating that the degree of esterification of the pectic polysaccharide is very low. The three peaks between 1000 $cm^{-1}$ and 1150 $cm^{-1}$ were caused by the stretching vibration of a glycosidic bond. In general, the analysis between 800 $cm^{-1}$ and 1200 $cm^{-1}$ is difficult, and it is called a fingerprint region.

Figure 3:
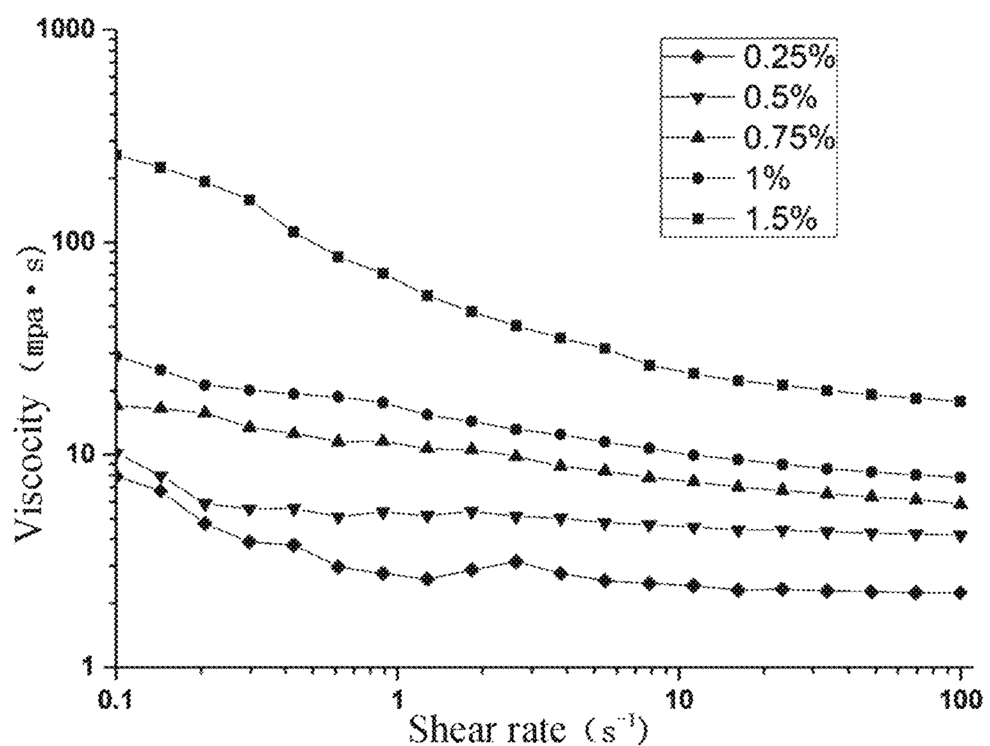
FIG. 3 is a flow curve of pectic polysaccharide of different concentrations.

The pectic polysaccharide obtained according to the above method was prepared into solutions having concentrations of 0.25%, 0.5%, 0.75%, 1%, and 1.5%, respectively, and after standing by for 12 h, it was loaded onto an HAAKE RheoStress 6000 rheometer, and the change in viscosity with shear rate was tested at a temperature of 25° C. by using a P60TiL parallel plate. The results are shown in FIG. 3. It can be seen from the figure that the pectic polysaccharide solution has a shear thinning phenomenon and is a typical pseudoplastic fluid. When the concentration rises from 1% to 1.5%, the viscosity rises greatly, and when the concentration rises from 0.25% to 1%, the viscosity rises correspondingly, having a thickening effect and thus a use as a thickener in the food industry.

Figure 4:
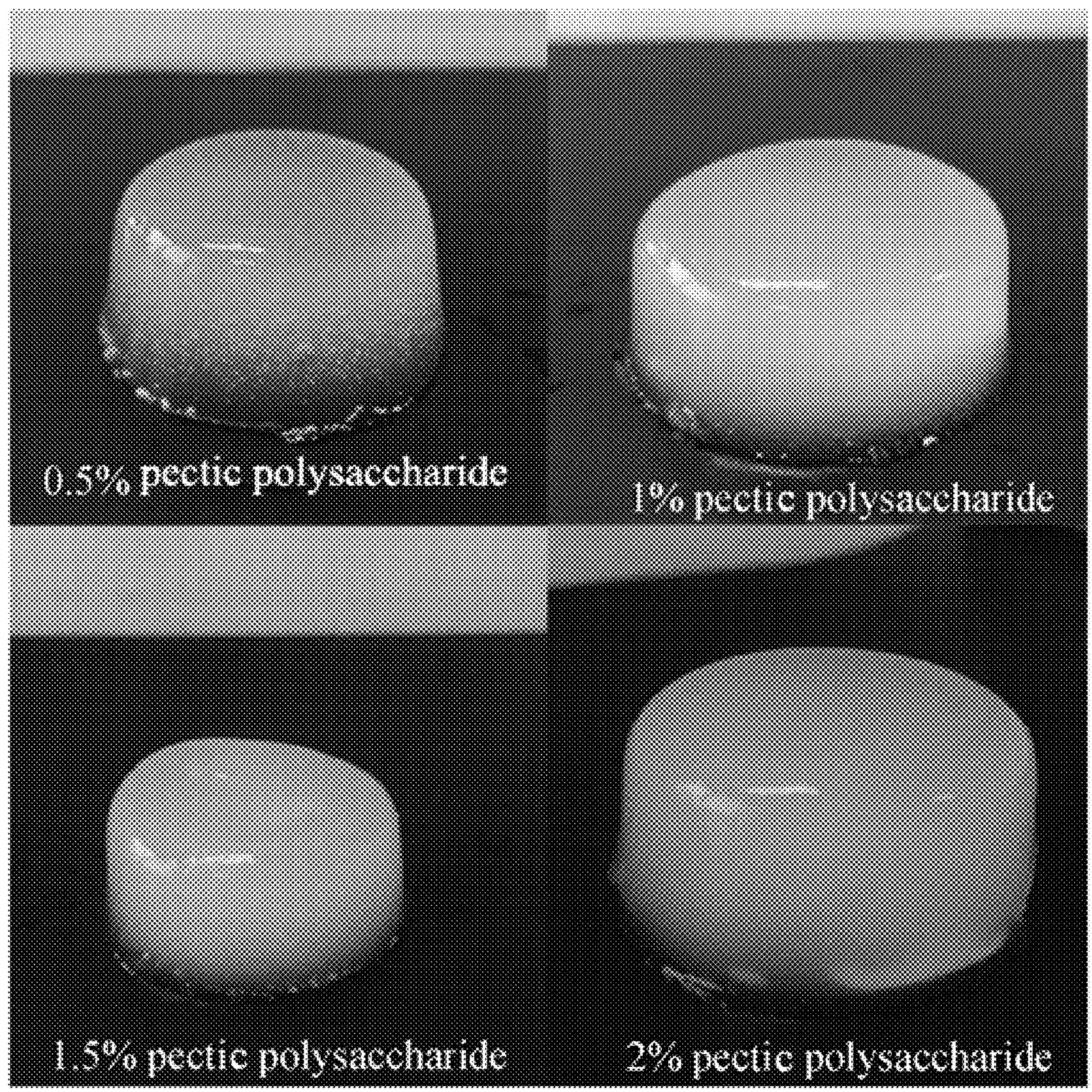
FIG. 4 shows gels formed by pectic polysaccharide of different concentrations.

The pectic polysaccharide obtained according to the above method is prepared into 15 ml of solutions having concentrations of 0.25%, 0.5%, 1%, and 1.5%, respectively, and the solution was added with 12.5 mg of calcium carbonate, and then added with 0.8% of D-glucono-1,5-lactone to obtain an integral gel as shown in FIG. 4 after standing by overnight.

4 groups of 1 L commercially available fresh pasteurized milk were respectively added with 70 g of sucrose, then added with pectic polysaccharides 0, 1, 3 and 5, respectively, heated to be fully dissolved, respectively added with 1 g of a yoghurt culture after being cooled, fermented for 8 h at a temperature of 42° C., and aged for 12 h in a 4° C. refrigerator after the fermentation was finished. The sensory evaluation was performed, the sensory evaluation was completed by 12 persons with simple training, the evaluation table was designed according to the sensory requirements of fermented milk in GB 19302-2010 “Food Safety National Standard Fermented Milk”, and the score table is as follows:

TABLE 2

| Score table of yogurt sensory evaluation | | | | |
|---|---|---|---|---|
| Quality index | Color | Taste | Odor | Texture state |
| 7-9 | The color is uniform and is milky white or yellowish. | It has the unique sweetness and acidity of fermented milk, and the taste is pure and appropriately sweet and sour. | It has pure yogurt fragrance, and pure yogurt flavor. | The texture is fine and uniform, has no large particles, and no bubbles, and a small amount of yellow lipid film and a small amount of whey are allowed to precipitate. The yogurt is hard and likes an egg custard in hardness. When the yogurt bottle is turned upside down, the coagulum will not break or fall, and the viscosity is appropriate. |
| 4-6 | The color is non-uniform, and is yellowish or light gray. | The sour taste is poor or excessive. | The yogurt fragrance is mild or slightly abnormal. | The texture is non-uniform and not strong, and has a small quantity of particles. There is obvious whey precipitated and the viscosity is too thin. |
| 1-3 | The color is dark grey and browning or other abnormal colors appear. | It has bitter or astringent taste. | It has a putrid taste, and mildew taste, and alcohol fermentation. | There is poor curd, there are air bubbles, severe precipitation of whey or a large quantity of creamy layers, and mildew spots on the surface. |

The score results are as follows:

TABLE 3

| Yogurt score table under different pectic polysaccharide addition amounts | | | | | |
|---|---|---|---|---|---|
| Pectin addition amount | Color | Taste | Odor | Texture | Total score |
| 0 g | 8 | 7 | 8 | 6 | 29 |
| 1 g | 8 | 8 | 8 | 7 | 31 |
| 3 g | 8 | 8 | 8 | 8 | 32 |
| 5 g | 6 | 7 | 7 | 8 | 28 |

From the above score results, it can be seen that when the addition amount of pectin is between 0 and 0.3%, the color, taste and odor of the yogurt do not change too much with the increase of the addition amount, but because of the addition of pectin, the whey precipitation rate of yogurt is reduced, the texture is finer and more uniform, and the taste is better. When the addition amount of pectin reaches 0.5%, the addition of pectin will affect the color of the yogurt, and the taste score will decrease, but the whey precipitation rate of the texture is less, and the score of the texture state is still relatively high.

Example 2

After being dried and crushed, 50 g of citrus fruit peels were mixed with 1500 ml of a 0.7% dilute hydrochloric acid solution, magnetically stirred at a constant temperature of 40° C. for 30 min, and then filtered with a 400-mesh filter bag to obtain a filtrate and a retentate. The retentate was mixed with 1500 ml of a 0.7% sodium hydroxide solution, magnetically stirred at a temperature of 40° C. for 60 min, and filtered with a 400-mesh filter bag, and the pH of the filtrate was adjusted to 6 with 2 M hydrochloric acid, and then the filtrate was precipitated with 1500 ml of 95% ethanol for 2 h. After the precipitation was finished, a retentate obtained by filtering with a 400-mesh filter bag was washed three times with 200 ml of 95% ethanol. The washed retentate was dried at a temperature of 55° C. for 24 h, and weighed to obtain 9.38 g of a pectic polysaccharide dry powder, and the yield was 18.76%.

The monosaccharide composition was determined according to the monosaccharide determination method in Example 1, and the results are as follows:

TABLE 4

| Monosaccharide composition of pectic polysaccharide | | | | | |
|---|---|---|---|---|---|
| Monosac-charide types | Galacturonic acid | Rhamnose | Glucose | Galactose | Arabinose |
| Content (wt %) | 24.56 | 12.36 | 5.33 | 17.72 | 40.63 |

As can be seen from Table 4, the monosaccharide of pectic polysaccharide is mainly neutral sugar. The neutral sugar mainly comprises rhamnose, galactose, arabinose and glucose. The value of rhamnose/galacturonic acid is calculated to be 0.50, and the value of (galactose+arabinose)/rhamnose is 4.72, indicating that the extracted polysaccharide is still the polysaccharide having a predominant RG-I structural domain, and the side chain is longer. The molecular weight is determined to be 738.5 kDa, which has no big difference from 743.2 kDa in Example 1. It was subjected to FT-IR analysis, indicating that it is also a lower ester polysaccharide having a degree of esterification of almost zero. It has relatively good thickening and stabilizing effects when applied in yogurt.

Example 3

After being dried and crushed, 50 g of citrus fruit peels were mixed with 1500 ml of a 1% dilute hydrochloric acid solution, magnetically stirred at a constant temperature of 40° C. for 120 min, and then filtered with a 400-mesh filter bag to obtain a filtrate and a retentate. The retentate was mixed with 1500 ml of a 2% sodium hydroxide solution, magnetically stirred at a temperature of 40° C. for 120 min, and filtered with a 400-mesh filter bag, the pH of the filtrate was adjusted to 6-7 with 2 M hydrochloric acid, and then the filtrate was precipitated with 1500 ml of 95% ethanol for 2 h. After the precipitation was finished, a retentate obtained by filtering with a 400-mesh filter bag was washed four times with 200 ml of 95% ethanol. The washed retentate was dried at a temperature of 55° C. for 24 h, and weighed to obtain 10.78 g of a pectic polysaccharide dry powder, and the yield was 21.56%.

The monosaccharide composition was determined according to the monosaccharide determination method in Example 1, and the results are as follows:

TABLE 5

| Monosaccharide composition of pectic polysaccharide | | | | | |
|---|---|---|---|---|---|
| Monosac-charide types | Galacturonic acid | Rhamnose | Glucose | Galactose | Arabinose |
| Content (wt %) | 30.07 | 11.36 | 10.77 | 16.72 | 31.08 |

As can be seen from Table 5, the content of acidic polysaccharide in pectic polysaccharide is increased to 30.37%, and the proportion of neutral sugar is still high. The neutral sugar mainly comprises rhamnose, galactose, arabinose and glucose. The value of rhamnose/galacturonic acid is calculated to be 0.38, and the value of (galactose+arabinose)/rhamnose is 4.21, indicating that the extracted polysaccharide is still the polysaccharide having a predominant RG-I structural domain and a longer side chain.

The molecular weight was determined according to the molecular weight determination method in Example 1, the weight average molecular weight was 683.2 kDa, the number average molecular weight was 161.7 kDa, and the dispersibility was 3.943. It was subjected to FT-IR analysis, indicating that it is also a lower ester polysaccharide having a degree of esterification of almost zero. It indicates that the molecular weight of the RG-I type pectic polysaccharide obtained under the conditions is smaller, and the measured apparent viscosity at a concentration of 1.5% is 102 mpa·s, which is smaller than the viscosity value under the preferable conditions.

Example 4

After being dried and crushed, 50 g of citrus fruit peels were mixed with 1500 ml of a 0.1% dilute hydrochloric acid solution, magnetically stirred at a constant temperature of 10° C. for 10 min, and then filtered with a 400-mesh filter bag to obtain a filtrate and a retentate. The retentate was mixed with 1500 ml of a 0.1% sodium hydroxide solution, magnetically stirred at a temperature of 25° C. for 5 min, and filtered with a 400-mesh filter bag, and the pH of the filtrate was adjusted to 6-7 with 2 M hydrochloric acid, and then the filtrate was precipitated with 1500 ml of 95% ethanol for 2 h. After the precipitation was finished, a retentate obtained by filtering with a 400-mesh filter bag was washed once with 200 ml of 95% ethanol. The washed retentate was dried at a temperature of 55° C. for 24 h, and weighed to obtain 6.38 g of a pectic polysaccharide dry powder, the yield was 12.76%, and the yield was lower than the yield under the preferable conditions.

The monosaccharide composition was determined according to the monosaccharide determination method in Example 1, and the results are as follows:

TABLE 6

| Monosaccharide composition of pectic polysaccharide | | | | | |
|---|---|---|---|---|---|
| Monosac-charide types | Galacturonic acid | Rhamnose | Glucose | Galactose | Arabinose |
| Content (wt %) | 21.72 | 4.78 | 16.49 | 14.36 | 42.65 |

As can be seen from Table 6 the content of acidic polysaccharide in pectic polysaccharide is increased to 21.72%, and the proportion of neutral sugar is still high. The neutral sugar mainly comprises rhamnose, galactose, arabinose and glucose. The value of rhamnose/galacturonic acid is calculated to be 0.22, and the value of (galactose+arabinose)/rhamnose is 11.92, indicating that the extracted polysaccharide is still the polysaccharide having a predominant RG-I structural domain and a longer side chain. It was subjected to FT-IR analysis, indicating that it is also a lower ester polysaccharide having a degree of esterification of almost zero.

2 g of the pectic polysaccharide and 10 g of bovine serum albumin BSA were mixed in 100 ml of deionized water, and stirred for 3 h to be completely dissolved. Then, the solution was added dropwise into a 0.3 M calcium chloride solution by a 0.8 mm-diameter nozzle, stirred slowly, allowed to stand by in a calcium chloride solution for 20 min, then washed with distilled water, and dried at a temperature of 37° C. to form bovine serum albumin-containing calcium pectin gel particles.

Finally, it should also be noted that the contents listed above are only a few specific embodiments of the present disclosure. It is apparent that the present disclosure is not limited to the above embodiments, and many variations are possible. All variations that can be directly derived or conceived by those of ordinary skill in the art from the disclosure of the present disclosure should be considered to be within the scope of the present disclosure.

What is claimed is:

1. A method for extracting RG-I-rich pectin, comprising the following steps:

(1) drying and crushing citrus fruit peels, mixing the dried and crushed citrus fruit peels with 0.1 to 1.0 wt % of a dilute hydrochloric acid solution according to a solid-liquid ratio of 1:30 g/ml, performing magnetically stirring at a constant temperature of 10 to 40° C. for 10 to 120 min, and then performing filtering with a 400-mesh filter bag to obtain a filtrate and a retentate;

(2) dispersing the retentate obtained in step (1) in 0.1 to 2.0 wt % of a sodium hydroxide solution having an equal volume to that of the dilute hydrochloric acid used in step (1), performing magnetically stirring at a temperature of 10 to 40° C. for 5 to 120 min, and performing filtering with a 400-mesh filter bag;

(3) adjusting pH of a filtrate obtained in step (2) to 6 to 7 with 2 M hydrochloric acid, then performing precipitation with 95% by volume of ethanol having an equal volume to that of the filtrate obtained in step (2) for 2 to 3 h, and, performing filtering with a 400-mesh filter bag after the precipitation is completed to obtain a retentate alkali-extracted pectic polysaccharide; and (4) washing the retentate alkali-extracted pectic polysaccharide 1 to 4 times with 95 wt % of ethanol to obtain a refined alkali-extracted pectic polysaccharide.

2. The method according to claim 1, wherein a mass fraction of HCL in the dilute hydrochloric acid solution is 0.3% to 0.7%, and a mass fraction of NaOH in the sodium hydroxide solution is 0.3 to 0.7%.

3. The method according to claim 1, wherein mixing and stirring of the dilute hydrochloric acid solution and the dried and crushed citrus fruit peels are controlled at a temperature of 20° C. to 40° C., and extraction with the sodium hydroxide solution in step (2) is controlled at a temperature of 20° C. to 40° C.

4. The method according to claim 1, wherein stirring of the dilute hydrochloric acid solution and the dried and crushed citrus fruit peels is controlled within 30-60 min, and extraction with the sodium hydroxide solution in step (2) is controlled within 10-50 min.

5. The method according to claim 1, wherein after the alkali-extracted pectic polysaccharide is obtained from alcohol precipitation, the polysaccharide is washed 2 to 3 times with 95% ethanol, so as to obtain a polysaccharide having good properties after drying.

* * * * *